(12) United States Patent
Krämer et al.

(10) Patent No.: US 12,724,129 B2
(45) Date of Patent: Sep. 1, 2026

(54) DETECTING OBJECTS IN A MONITORED ZONE

(71) Applicant: SICK AG, Waldkirch (DE)

(72) Inventors: Joachim Krämer, Waldkirch (DE); Markus Hammes, Waldkirch (DE); Max Böhme, Waldkirch (DE)

(73) Assignee: SICK AG, Waldkirch (DE)

( * ) Notice: Subject to any disclaimer, the term of this patent is extended or adjusted under 35 U.S.C. 154(b) by 755 days.

(21) Appl. No.: 18/193,179

(22) Filed: Mar. 30, 2023

(65) Prior Publication Data

US 2023/0314574 A1 Oct. 5, 2023

(51) Int. Cl.
*G01S 7/48* (2006.01)
*G01S 7/481* (2006.01)
*G01S 7/4865* (2020.01)
*G01S 17/42* (2006.01)

(52) U.S. Cl.
CPC .......... *G01S 7/4865* (2013.01); *G01S 7/4817* (2013.01); *G01S 17/42* (2013.01)

(58) Field of Classification Search
None
See application file for complete search history.

(56) References Cited

U.S. PATENT DOCUMENTS

2019/0011541 A1* 1/2019 O'Keeffe .............. G01S 7/4817

FOREIGN PATENT DOCUMENTS

| | | | |
|---|---|---|---|
| CN | 113259612 | A | 8/2021 |
| DE | 4340756 | A1 | 6/1994 |
| DE | 202017104437 | U1 | 12/2018 |
| DE | 202021103966 | U1 | 12/2022 |
| EP | 1632791 | A2 | 3/2006 |
| EP | 1972961 | A2 | 9/2008 |
| EP | 2469296 | B1 | 10/2012 |
| EP | 3012663 | A1 | 4/2016 |
| EP | 3059608 | A1 | 8/2016 |
| EP | 3267218 | A1 | 1/2018 |
| EP | 3287809 | B1 | 10/2019 |
| EP | 3916286 | A1 | 12/2021 |

OTHER PUBLICATIONS

Search Report dated Oct. 4, 2022 issued in corresponding European Application No. 22166230.7.
Sick Sensor Intelligence, microScan3-EtherNet/IP.

* cited by examiner

*Primary Examiner* — Hovhannes Baghdasaryan
(74) *Attorney, Agent, or Firm* — Nath, Goldberg & Meyer; Joshua B. Goldberg

(57) ABSTRACT

An optoelectronic scanner for detecting objects in a monitored zone is provided that has a light transmitter for transmitting at least one light beam, a movable deflection unit for the periodic scanning of the monitored zone by the at least one light beam, a light receiver for generating a received signal from the light beam remitted by the objects, and a control and evaluation unit that is configured to acquire information on the objects in the monitored zone from the received signal and to recognize dazzling of the light receiver and to switch into a dazzle state in the case of dazzle preventing safe detection. In this respect, first phases with dazzling and second phases without dazzle are recognized and a decision is made with reference to the distribution of the first phases and second phases whether dazzle prevents the safe detection.

15 Claims, 7 Drawing Sheets

Figure 2

| Scan # | 89.626 | 89.754 | 89.883 | 90.012 | 90.141 | 90.271 | 90.4 |
|---|---|---|---|---|---|---|---|
| 1831 | 15 | 15 | 2 | 7 | 15 | 15 | 15 |
| 1832 | 15 | 11 | 7 | 14 | 2 | 15 | 15 |
| 1833 | 15 | 15 | 6 | 2 | 2 | 15 | 15 |
| 1834 | 15 | 15 | 2 | 14 | 2 | 15 | 15 |
| 1835 | 15 | 6 | 10 | 2 | 6 | 15 | 15 |
| 1836 | 15 | 15 | 14 | 2 | 2 | 15 | 15 |
| 1837 | 15 | 14 | 2 | 10 | 6 | 15 | 15 |
| 1838 | 15 | 10 | 10 | 6 | 10 | 15 | 15 |
| 1839 | 15 | 15 | 10 | 14 | 14 | 15 | 15 |
| 1840 | 15 | 14 | 11 | 6 | 2 | 15 | 15 |
| 1841 | 15 | 15 | 2 | 10 | 2 | 15 | 15 |
| 1842 | 15 | 14 | 2 | 15 | 11 | 15 | 15 |
| 1843 | 15 | 15 | 10 | 10 | 14 | 15 | 15 |
| 844 | 15 | 11 | 10 | 10 | 10 | 15 | 15 |
| 845 | 15 | 15 | 2 | 6 | 2 | 15 | 15 |
| 846 | 15 | 6 | 10 | 6 | 2 | 15 | 15 |
| 847 | 15 | 14 | 15 | 14 | 14 | 15 | 15 |
| 1848 | 15 | 10 | 2 | 14 | 10 | 15 | 15 |
| 1849 | 15 | 14 | 2 | 10 | 2 | 15 | 15 |
| 1850 | 15 | 15 | 11 | 10 | 7 | 15 | 15 |
| 1851 | 15 | 14 | 6 | 15 | 2 | 15 | 15 |
| 1852 | 15 | 14 | 2 | 10 | 2 | 15 | 15 |
| 1853 | 15 | 11 | 10 | 15 | 14 | 15 | 15 |
| 1854 | 15 | 14 | 10 | 15 | 2 | 14 | 15 |
| 1855 | 15 | 14 | 6 | 14 | 10 | 15 | 15 |
| 1856 | 15 | 14 | 10 | 11 | 6 | 15 | 15 |
| 1857 | 15 | 15 | 2 | 10 | 2 | 14 | 15 |
| 1858 | 15 | 10 | 2 | 10 | 14 | 15 | 15 |
| 1859 | 15 | 11 | 2 | 11 | 2 | 15 | 15 |
| 1860 | 15 | 11 | 2 | 7 | 6 | 15 | 15 |

Angle Safety Beam [°]

Figure 3

| Scan # | 89.626 | 89.754 | 89.883 | 90.012 | 90.141 | 90.271 | 90.4 |
|---|---|---|---|---|---|---|---|
| 1831 | 9.7 | 9.6 | 65 | 9 | 9.3 | 9.7 | 9.7 |
| 1832 | 9.7 | 9.6 | 8.9 | 65 | 65 | 9.7 | 9.7 |
| 1833 | 9.7 | 9.7 | 65 | 65 | 65 | 9.7 | 9.7 |
| 1834 | 9.7 | 9.7 | 65 | 65 | 65 | 9.7 | 9.7 |
| 1835 | 9.8 | 65 | 65 | 65 | 65 | 9.7 | 9.7 |
| 1836 | 9.7 | 9.7 | 65 | 65 | 65 | 9.7 | 9.7 |
| 1837 | 9.7 | 65 | 65 | 65 | 65 | 9.7 | 9.7 |
| 1838 | 9.8 | 65 | 65 | 65 | 65 | 9.7 | 9.7 |
| 1839 | 9.7 | 9.7 | 65 | 65 | 65 | 9.7 | 9.7 |
| 1840 | 9.7 | 65 | 8.9 | 65 | 65 | 9.7 | 9.7 |
| 1841 | 9.7 | 9.6 | 65 | 65 | 65 | 9.7 | 9.7 |
| 1842 | 9.7 | 65 | 65 | 8.8 | 9.2 | 9.7 | 9.7 |
| 1843 | 9.7 | 9.7 | 65 | 65 | 65 | 9.7 | 9.7 |
| 1844 | 9.7 | 9.6 | 65 | 9.1 | 65 | 9.7 | 9.7 |
| 1845 | 9.7 | 9.7 | 65 | 65 | 65 | 9.7 | 9.7 |
| 1846 | 9.8 | 65 | 65 | 65 | 65 | 9.7 | 9.7 |
| 1847 | 9.7 | 65 | 8.9 | 65 | 65 | 9.7 | 9.7 |
| 1848 | 9.7 | 65 | 65 | 65 | 65 | 9.7 | 9.7 |
| 1849 | 9.7 | 65 | 65 | 65 | 65 | 9.7 | 9.7 |
| 1850 | 9.7 | 9.7 | 9 | 65 | 65.5 | 9.7 | 9.7 |
| 1851 | 9.8 | 65 | 65 | 8.9 | 65 | 9.7 | 9.7 |
| 1852 | 9.7 | 65 | 65 | 65 | 65 | 9.7 | 9.7 |
| 1853 | 9.7 | 9.6 | 65 | 9 | 65 | 9.7 | 9.7 |
| 1854 | 9.7 | 65 | 65 | 8.9 | 65 | 9.7 | 9.7 |
| 1855 | 9.8 | 65 | 65 | 65 | 65 | 9.7 | 9.7 |
| 1856 | 9.8 | 65 | 65 | 8.9 | 65 | 9.7 | 9.7 |
| 1857 | 9.7 | 9.6 | 65 | 65 | 65 | 65 | 9.7 |
| 1858 | 9.7 | 65 | 65 | 65 | 65 | 9.7 | 9.7 |
| 1859 | 9.7 | 9.7 | 65 | 9.2 | 65 | 9.7 | 9.7 |
| 1860 | 9.8 | 9.6 | 65 | 8.9 | 65 | 9.7 | 9.7 |

Angle Safety Beam [°]

Figure 4

| Scan # | 89.626 | 89.754 | 89.883 | 90.012 | 90.141 | 90.271 | 90.4 |
|---|---|---|---|---|---|---|---|
| 1831 | 0 | 0 | 1 | 0 | 0 | 0 | 0 |
| 1832 | 0 | 0 | 0 | 1 | 1 | 0 | 0 |
| 1833 | 0 | 0 | 1 | 1 | 1 | 0 | 0 |
| 1834 | 0 | 0 | 1 | 1 | 1 | 0 | 0 |
| 1835 | 0 | 1 | 1 | 1 | 1 | 0 | 0 |
| 1836 | 0 | 0 | 1 | 1 | 1 | 0 | 0 |
| 1837 | 0 | 1 | 1 | 1 | 1 | 0 | 0 |
| 1838 | 0 | 1 | 1 | 1 | 1 | 0 | 0 |
| 1839 | 0 | 0 | 1 | 1 | 1 | 0 | 0 |
| 1840 | 0 | 1 | 0 | 1 | 1 | 0 | 0 |
| 1841 | 0 | 0 | 1 | 1 | 1 | 0 | 0 |
| 1842 | 0 | 1 | 1 | 0 | 0 | 0 | 0 |
| 1843 | 0 | 0 | 1 | 1 | 1 | 0 | 0 |
| 1844 | 0 | 0 | 1 | 0 | 1 | 0 | 0 |
| 1845 | 0 | 0 | 1 | 1 | 1 | 0 | 0 |
| 1846 | 0 | 1 | 1 | 1 | 1 | 0 | 0 |
| 1847 | 0 | 1 | 0 | 1 | 1 | 0 | 0 |
| 1848 | 0 | 1 | 1 | 1 | 1 | 0 | 0 |
| 1849 | 0 | 1 | 1 | 1 | 1 | 0 | 0 |
| 1850 | 0 | 0 | 0 | 1 | 0 | 0 | 0 |
| 1851 | 0 | 1 | 1 | 0 | 1 | 0 | 0 |
| 1852 | 0 | 1 | 1 | 1 | 1 | 0 | 0 |
| 1853 | 0 | 0 | 1 | 0 | 1 | 0 | 0 |
| 1854 | 0 | 1 | 1 | 0 | 1 | 0 | 0 |
| 1855 | 0 | 1 | 1 | 1 | 1 | 0 | 0 |
| 1856 | 0 | 1 | 1 | 0 | 1 | 0 | 0 |
| 1857 | 0 | 0 | 1 | 1 | 1 | 1 | 0 |
| 1858 | 0 | 1 | 1 | 1 | 1 | 0 | 0 |
| 1859 | 0 | 0 | 1 | 0 | 1 | 0 | 0 |
| 1860 | 0 | 0 | 1 | 0 | 1 | 0 | 0 |

Angle Safety Beam [°]

Figure 5

| Scan # | 89.652 | 89.782 | 89.911 | 90.039 | 90.168 | 90.297 | 90.425 |
|---|---|---|---|---|---|---|---|
| 931 | 8 | 14 | 10 | 2 | 2 | 10 | 6 |
| 932 | 12 | 12 | 12 | 12 | 12 | 12 | 12 |
| 933 | 12 | 12 | 12 | 12 | 12 | 12 | 12 |
| 934 | 12 | 12 | 12 | 12 | 12 | 12 | 12 |
| 935 | 12 | 12 | 12 | 12 | 12 | 12 | 12 |
| 936 | 12 | 6 | 2 | 2 | 2 | 2 | 6 |
| 937 | 12 | 2 | 2 | 6 | 2 | 2 | 6 |
| 938 | 12 | 12 | 12 | 12 | 12 | 12 | 12 |
| 939 | 12 | 12 | 12 | 12 | 12 | 12 | 12 |
| 940 | 12 | 12 | 12 | 12 | 12 | 12 | 12 |
| 941 | 12 | 12 | 12 | 12 | 12 | 12 | 12 |
| 942 | 4 | 2 | 2 | 2 | 2 | 2 | 6 |
| 943 | 12 | 2 | 2 | 2 | 2 | 2 | 14 |
| 944 | 12 | 12 | 12 | 12 | 12 | 12 | 12 |
| 945 | 12 | 12 | 12 | 12 | 12 | 12 | 12 |
| 946 | 12 | 12 | 12 | 12 | 12 | 12 | 12 |
| 947 | 12 | 12 | 12 | 12 | 12 | 12 | 12 |
| 948 | 12 | 2 | 2 | 2 | 2 | 2 | 2 |
| 949 | 12 | 12 | 12 | 12 | 12 | 12 | 12 |
| 950 | 12 | 12 | 12 | 12 | 12 | 12 | 12 |
| 951 | 12 | 12 | 12 | 12 | 12 | 12 | 12 |
| 952 | 12 | 12 | 12 | 12 | 12 | 12 | 12 |
| 953 | 12 | 6 | 2 | 2 | 2 | 2 | 2 |
| 954 | 12 | 2 | 2 | 6 | 2 | 2 | 6 |
| 955 | 12 | 12 | 12 | 12 | 12 | 12 | 12 |
| 956 | 12 | 12 | 12 | 12 | 12 | 12 | 12 |
| 957 | 12 | 12 | 12 | 12 | 12 | 12 | 12 |
| 958 | 12 | 12 | 12 | 12 | 12 | 12 | 12 |
| 959 | 4 | 2 | 2 | 2 | 2 | 2 | 6 |
| 960 | 14 | 2 | 2 | 6 | 2 | 2 | 14 |

Angle Safety Beam [°]

Figure 6

| Scan # | 89.652 | 89.782 | 89.911 | 90.039 | 90.169 | 90.297 | 90.425 |
|---|---|---|---|---|---|---|---|
| 931 | 65 | 65 | 65 | 65 | 65.5 | 65 | 65 |
| 932 | 10 | 8.9 | 8.9 | 8.9 | 8.9 | 8.9 | 8.9 |
| 933 | 10 | 8.9 | 8.9 | 8.9 | 8.9 | 8.9 | 8.9 |
| 934 | 10 | 8.9 | 8.9 | 8.9 | 8.9 | 8.9 | 8.9 |
| 935 | 10 | 8.9 | 8.9 | 8.9 | 8.9 | 8.9 | 8.9 |
| 936 | 65 | 65 | 65 | 65 | 65 | 65 | 65 |
| 937 | 10 | 65 | 65 | 65 | 65 | 65 | 65 |
| 938 | 10 | 8.9 | 8.9 | 8.9 | 8.9 | 8.9 | 8.9 |
| 939 | 10 | 8.9 | 8.9 | 8.9 | 8.9 | 8.9 | 8.9 |
| 940 | 10 | 8.9 | 8.9 | 8.9 | 8.9 | 8.9 | 8.9 |
| 941 | 10 | 8.9 | 8.9 | 8.9 | 8.9 | 8.9 | 8.9 |
| 942 | 65 | 65 | 65 | 65 | 65 | 65 | 65 |
| 943 | 10.1 | 65 | 65 | 65 | 65 | 65 | 65 |
| 944 | 10 | 8.9 | 8.9 | 8.9 | 8.9 | 8.9 | 8.9 |
| 945 | 10 | 8.9 | 8.9 | 8.9 | 8.9 | 8.9 | 8.9 |
| 946 | 10 | 8.9 | 8.9 | 8.9 | 8.9 | 8.9 | 8.9 |
| 947 | 10 | 8.9 | 8.9 | 8.9 | 8.9 | 8.9 | 8.9 |
| 948 | 10 | 65 | 65 | 65 | 65 | 65 | 65 |
| 949 | 10 | 8.9 | 8.9 | 8.9 | 8.9 | 8.9 | 8.9 |
| 950 | 10 | 8.9 | 8.9 | 8.9 | 8.9 | 8.9 | 8.9 |
| 951 | 10 | 8.9 | 8.9 | 8.9 | 8.9 | 8.9 | 8.9 |
| 952 | 10 | 8.9 | 8.9 | 8.9 | 8.9 | 8.9 | 8.9 |
| 953 | 65 | 65 | 65 | 65 | 65 | 65 | 65 |
| 954 | 10 | 65 | 65 | 65 | 65 | 65 | 65 |
| 955 | 10 | 8.9 | 8.9 | 8.9 | 8.9 | 8.9 | 8.9 |
| 956 | 10 | 8.9 | 8.9 | 8.9 | 8.9 | 8.9 | 8.9 |
| 957 | 10 | 8.9 | 8.9 | 8.9 | 8.9 | 8.9 | 8.9 |
| 958 | 10 | 8.9 | 8.9 | 8.9 | 8.9 | 8.9 | 8.9 |
| 959 | 65 | 65 | 65 | 65 | 65 | 65 | 65 |
| 960 | 65 | 65 | 65 | 65 | 65 | 65 | 65 |

Angle Safety Beam [°]

Figure 7

| Scan # | 89.652 | 89.782 | 89.911 | 90.039 | 90.169 | 90.297 | 90.425 |
|---|---|---|---|---|---|---|---|
| 931 | 0 | 1 | 1 | 1 | 0 | 1 | 1 |
| 932 | 0 | 0 | 0 | 0 | 0 | 0 | 0 |
| 933 | 0 | 0 | 0 | 0 | 0 | 0 | 0 |
| 934 | 0 | 0 | 0 | 0 | 0 | 0 | 0 |
| 935 | 0 | 0 | 0 | 0 | 0 | 0 | 0 |
| 936 | 0 | 1 | 1 | 1 | 1 | 1 | 1 |
| 937 | 0 | 1 | 1 | 1 | 1 | 1 | 1 |
| 938 | 0 | 0 | 0 | 0 | 0 | 0 | 0 |
| 939 | 0 | 0 | 0 | 0 | 0 | 0 | 0 |
| 940 | 0 | 0 | 0 | 0 | 0 | 0 | 0 |
| 941 | 0 | 0 | 0 | 0 | 0 | 0 | 0 |
| 942 | 0 | 1 | 1 | 1 | 1 | 1 | 1 |
| 943 | 0 | 1 | 1 | 1 | 1 | 1 | 1 |
| 944 | 0 | 0 | 0 | 0 | 0 | 0 | 0 |
| 945 | 0 | 0 | 0 | 0 | 0 | 0 | 0 |
| 946 | 0 | 0 | 0 | 0 | 0 | 0 | 0 |
| 947 | 0 | 0 | 0 | 0 | 0 | 0 | 0 |
| 948 | 0 | 1 | 1 | 1 | 1 | 1 | 1 |
| 949 | 0 | 0 | 0 | 0 | 0 | 0 | 0 |
| 950 | 0 | 0 | 0 | 0 | 0 | 0 | 0 |
| 951 | 0 | 0 | 0 | 0 | 0 | 0 | 0 |
| 952 | 0 | 0 | 0 | 0 | 0 | 0 | 0 |
| 953 | 0 | 1 | 1 | 1 | 1 | 1 | 1 |
| 954 | 0 | 1 | 1 | 1 | 1 | 1 | 1 |
| 955 | 0 | 0 | 0 | 0 | 0 | 0 | 0 |
| 956 | 0 | 0 | 0 | 0 | 0 | 0 | 0 |
| 957 | 0 | 0 | 0 | 0 | 0 | 0 | 0 |
| 958 | 0 | 0 | 0 | 0 | 0 | 0 | 0 |
| 959 | 0 | 1 | 1 | 1 | 1 | 1 | 1 |
| 960 | 1 | 1 | 1 | 1 | 1 | 1 | 1 |

Angle Safety Beam [°]

DETECTING OBJECTS IN A MONITORED ZONE

The invention relates to an optoelectronic sensor and to a method of detecting objects in a monitored zone.

Laser scanners are frequently used for optical monitoring. In this, a light beam generated by a laser p eriodically sweeps over a monitored zone with the help of a deflection unit. The light is remitted at objects in the monitored zone and is evaluated in the scanner. A conclusion is drawn on the angular location of the object from the angular position of the deflection unit and additionally on the distance of the object from the laser scanner from the time of flight while using the speed of light. In this respect, two general principles are known to determine the time of flight. In phase-based processes, the transmitted light is modulated and the phase shift of the received light with respect to the transmitted light is evaluated. In pulse-based processes, such as are preferably used in safety technology, the laser scanner measures the time of flight until a transmitted light pulse is received again. In a pulse averaging process known, for example, from EP 1 972 961 A2 or EP 2 469 296 B1, a plurality of individual pulses are transmitted for a measurement, and the received pulses are statistically evaluated.

An important application is the safeguarding of a hazard source in safety engineering. In this respect, the laser scanner monitors a protected field which may not be entered by operators during the operation of the machine. Since the laser scanner acquires angle and distance information, two-dimensional positions of objects in the monitored zone and thus also in the protected field can be determined. If the laser scanner recognizes an unauthorized intrusion into the protected field, for instance a leg of an operator, it triggers an emergency stop of the machine.

Sensors used in safety technology have to work particularly reliably and must therefore satisfy high safety demands, for example the EN13849 standard for safety of machinery and the machine standard EN1496 for electro-sensitive protective equipment (ESPE). A number of measures have to be taken to satisfy these safety standards such as safe electronic evaluation by redundant, diverse electronics, function monitoring and/or provision of individual test targets with defined degrees of reflection which have to be recognized at the corresponding scanning angles. A safety laser scanner in accordance with such standards is known, for example, from DE 43 40 756 A1.

In accordance with a demand of the machine standard EN 61496-3, extraneous light or the mutual influencing of sensors may not result in any hazardous failure. A detection loss is above threatened when an extraneous light source such as another infrared sensor or a construction site flood lamp is located behind a dark object to be detected. The actual measured signal of the dark object is thereby superposed by strong extraneous light and can no longer be detected from a certain point onward. Such dazzle can be recognized by a determination of the extraneous light level in the received signal and the sensor can then be switched to a locked state in which a monitored machine is switched to a safe state. Safety is thus established and the standard satisfied. In the dazzle case, the system is then, however, no longer available as long as the extraneous light irradiation is present even though there is no risk per se due to objects in the monitored zone.

Dazzle recognition is further improved in the still unpublished European patent application having the file reference 21187348.4. If dazzle is recognized, only a dazzle warning is first triggered. The sensor only switches into the locked state if this lasts for at least five seconds. If no dazzle is present over a certain duration, the dazzle warning is cancelled again.

Unnecessary shutdowns with an only temporary brief dazzling can be avoided by this improved dazzle recognition. In contrast, the availability in the case of pulsed extraneous light sources is not improved, above all in the form of further sensors in the environment, for example other laser scanners or 3D TOF cameras. The latter simultaneously dazzle a large number of scan devices by their area illumination and a relevant portion of the measured data within a scan therefore becomes unusable. There are per se sufficient time windows available between the extraneous light pulses in which a measurement can be taken without dazzle. The dazzle warning is, however, never canceled because the dazzle repeats too rapidly. Depending on the scan frequency of the laser scanner with dazzle recognition and dazzle frequency of the extraneous light source, for example the frame rate of an infrared camera, the time sequence of the dazzle by the pulsed extraneous light can additionally become more complex due to beat effects. The problem remains in every case, even with less complex external light sources, that dazzle can repeat at intervals that are too short, that the dazzle warning is thus permanently activated, and that the laser scanner changes into the permanent dazzle error after five seconds.

An additional level measurement in a laser scanner that is based on improved dazzle recognition of the unpublished European patent application 21187348.4 is also known from other documents. For example, a histogram is built up from a plurality of individual pulses in a pulse averaging method in EP 1 972 961 A2 already briefly mentioned above and a maximum or an integral is then determined as a measure for the intensity in addition to the reception point in time for the distance measurement. EP 3 059 608 A1 determines the received level of a laser scanner in the supply of the light receiver. The respective intensity information or level information is then, however, not respectively used for dazzle recognition, but rather, for example, for a black and white correction of the distance measurement or a special adaptation of the further evaluation to the high level of a reflector.

EP 3 267 218 A1 deals with the configuration of a clutter filter for a safety laser scanner. Clutter is understood here as dust, rain, snow, and the like. Certain difficult detection situations can be resolved by an optimized clutter filter, but this is a different problem than dazzle due to an extraneous light source.

A so-called multiple evaluation is furthermore typical in usual laser scanners such as known, for example, from EP 3 267 218 A1 or EP 3 916 286 A1. A protected field intrusion only recognized in a single scan is here still tolerated; a safety related reaction is only triggered when such an intrusion is repeated twice, three times, or four times up to 16 times depending on the design of the multiple evaluation. This conventional multiple evaluation, however, relates to protected field intrusions and not to dazzle by an extraneous light source. In addition, the multiple evaluation is ended in fractions of a second while dazzle only becomes safety relevant after a plurality of seconds.

It is therefore the object of the invention to find an improved management of dazzle for a safety sensor of the category.

This object is satisfied by an optoelectronic sensor, in particular a laser scanner, and by a method for detecting objects in a monitored zone in accordance with the respective independent claim. The sensor is preferably a safe sensor, that is a safety sensor or safety laser scanner. In this respect, safe or safety is to be understood in the sense of the standards named in the introduction or of comparable standards for machine safety or electrosensitive protective equipment; measures are therefore taken to control errors up to a specified safety level.

A light transmitter transmits at least one light bundle into a monitored zone, preferably a light beam, in particular a collimated light beam, having a small cross-section. The transmitted light bundle is periodically guided over the monitored zone with the aid of a movable deflection unit. A light receiver generates a received signal from the reflected light bundle or light beam. No difference is made in terminology here between directed reflection and non-directed scatter or remission. A plane in the monitored zone is thus scanned repeatedly by the movement of the deflection unit. In some embodiments, the light transmitter generates a plurality of light beams spaced apart from one another and the light receiver is correspondingly configured for the reception of a plurality of light beams. A multi-plane scanning is thereby made possible; the scanner is then a multi-plane scanner.

The received signal is evaluated in a control and evaluation unit to acquire information on the detected objects. A respective distance is in particular measured by a time of flight process. In this process, measurement is preferably pulse based, the transmitted light beam therefore has at least one light pulse whose time of flight is determined. In addition to a single pulse process, a pulse averaging process is possible such as is described in EP 1 972 961 A2 or EP 2 469 296 B1 named in the introduction.

The control and evaluation unit additionally recognizes dazzling of the light receiver. If the dazzle prevents a safe detection, in particular no longer permits a safe protected field evaluation, the sensor switches into a dazzle state. In this respect, preventing a safe detection means that the safety required by the standard is no longer given and objects that are actually present may possibly no longer be detected. In the individual case, an object may by all means still be detectable, but the sensor can no longer ensure this over the full specified functional extent in the dazzle state. The dazzle state can be reported as an error, for example; the performance of the sensor, for instance the range, can be restricted so that safety is only ensured to a lesser functional extent or a safety related reaction takes place, i.e. a signal is output by which a monitored machine is switched to a safe state.

The invention starts from the basic idea that not all dazzling of the sensor is safety critical. To decide whether dazzle prevents the safe detection and whether the dazzle state has to be adopted, first phases with dazzling and second phases without dazzling are recognized and the distribution of the first phases and of the second phases is evaluated. The sensor does not immediately have to switch to the dazzle state on the first dazzling; there is a certain time window of, for example, five seconds available to check this and to determine the distribution.

In this respect, both first phases and second phases do not explicitly have to be determined since the one is the complement of the other, the direct determination of only the first phases or of only the second phases is sufficient. A phase can, for example, be a measurement period with a determination of a measured value, in particular a distance value for the current angular position, or a period of the movable scan unit, which is also called a scan.

A distinction can be made between a permanent dazzle and recurring or periodic short dazzle by evaluating the distribution of the first phases and second phases. Whereas permanent dazzle prevents a safe detection as a rule, a periodic dazzle can be tolerated provided that enough second phases without dazzle remain. Whether the first phases exceed a critical portion can be a preferred criterion of the evaluation of the distribution. This can then be understood as a kind of duty cycle. The dazzle state is only adopted when the first phases with dazzling become too dominant. A critical portion is specified more precisely in embodiments; it can be the accumulated time portion or the number of the first phases with respect to the number of the second phases, but can also be dependent on the sequence.

Two aspects must be distinguished in the dazzle recognition in accordance with the invention. It is first recognized whether the light receiver is dazzled to classify a phase as a first phase or a second phase. The distribution of the first and second phases are then secondly evaluated to determine whether the sensor can still safely detect objects despite the at least occasional dazzle or whether the dazzle prevents the safe detection.

The invention has the advantage that the availability of the sensor is above all considerably increased in spatial proximity to pulsed extraneous light sources, primarily further sensors such as other laser scanners or 3D TOF cameras. There are therefore fewer times in which the sensor changes into the locked state due to the dazzling even though objectively no safety critical objects are present in the monitored zone. The sensor can still safely satisfy its function in many cases despite the extraneous light disruptor. In this respect, the dazzle sensitivity is even adaptable since which distributions and in particular which critical portion of first phases with dazzling prevents the safe detection can be made dependent on the application, the unit variant, and for example, also on the configuration of the sensor, in particular its currently monitored protected fields. In addition improved diagnosis possibilities are provided since which type of dazzle it is, in particular periodic dazzle or permanent dazzle, can be displayed to the user. Changes in the assembly position and assembly orientation can thereby possibly be carried out by the sensor and extraneous light disruptors to reduce or to avoid dazzling.

The control and evaluation unit is preferably configured to count the first phases over a time interval and/or to determine an accumulated duration of the first phases over the time interval. This is a summary observation of the distribution. The time interval amounts, for example, to some seconds, in particular to the five seconds over which a degraded detection capability can still be accepted according to safety standards such as EN 61496-3 without having to react in a safety related manner. The time interval can repeatedly start again from the beginning or can be counted in a rolling manner or an accumulated duration can be determined. The phases are furthermore preferably respective measurement periods or scans. Counting and determining the accumulated duration are then ultimately the same since the accumulated duration is the product of the number of phases times the duration of a phase. Since the first phases are the complement of the second phases, the first phases and second phases are simultaneously determined over the time interval or the known total number of measurement periods or scans in the time interval. It is therefore equally possible to count second phases or to determine their accumulated duration; this is preferably not distinguished and is also a form of the counting or of the determination of the accumulated duration of first phases. It must furthermore be noted that the number and accumulated duration of first phases correlate with one another as the product of number and duration of a single first phase provided that first phases are understood as a regular procedure such as a measurement period or a scan.

The control and evaluation unit is preferably configured to determine a time pattern of the first phases and of the second phases and to decide whether the dazzling impairs the detection using said time pattern. This replaces or complements an accumulated observation. Time patterns can be categorized into those that still enable a safe detection and those that prevent it. This goes beyond a mere summary evaluation; a long-lasting first phase or a direct sequence of a plurality of first phases can, for example, be more critical than a plurality of brief intermittent first phases that even perhaps extends over a longer duration in sum. It is in particular possible to recognize a periodic pattern of a pulsed extraneous light source, with this not necessarily directly revealing the period of the extraneous light source, but with rather a time pattern of a beat being able to arise between a frequency of the period scanning of the sensor and the pulse repetition rate of the extraneous light source.

The control and evaluation unit is preferably configured to place the detection of objects at times in which two phases likely lie in accordance with a recognized time pattern. Once a time pattern is known, there is also an expectation of how it will continue. A one-time or a repeated time offset can thereby be introduced into the measurement under certain circumstances with which a direct measurement is made when the sensor is dazzled, i.e. in second phases. The dazzle monitoring is particularly continued in technical safety applications to verify by it whether the expectation has also occurred that the dazzle now no longer prevents a safe detection.

The sensor preferably as an additional light receiver for dazzle recognition. Whereas embodiments in accordance with the above-named second aspect as to how a distribution of first phases and second phases can be evaluated whether a safe detection is prevented by dazzle have been described up to now, it is now a question of embodiments that design the first aspect as to how dazzle is recognized at all, that is how first phases and second phases are recognized. A dedicated additional receiver can be provided for this purpose. The actual measurement with the light receiver to detect the remitted light beam is thereby relieved. A safety laser scanner as a rule has further light receivers with which the transmission capability of the front screen is monitored; they can also be used in a dual function for dazzle recognition.

The control and evaluation unit is preferably configured to recognize dazzle using the received signal. In this embodiment, the dazzle recognition takes place using the received signal, that is from the remitted light beam or the measurement beam, sensing beam, or scan beam. No additional components are then required; the received signal is subjected to a further evaluation in addition to the detection of information on objects or a distance measurement by which dazzle is recognized. The dazzle recognition can use separate time sections of the received signal, for example right at the start or end of a respective measurement period, for a better distinction of useful light of the remitted light beam and extraneous light. A dazzle recognition by means of an additional light receiver can be combined with dazzle recognition from the received signal.

The control and evaluation unit is preferably configured to recognize dazzle with reference to a level determination of the received signal or a determination of the signal-to-noise ratio of the received signal. The current flowing in the light receiver is measured for this purpose, for example, in particular also in a supply of the light receiver as in EP 3 059 608 A1 named in the introduction. The level can be an overall level, that is the superposition of extraneous light and useful light, or only extraneous light can be measured as a CW light portion, for example by low pass filtering. A pulsed extraneous light source is, however, actually not detected by low pass filtering. It may therefore be sensible to integrate the current flowing in the light receiver. The level and the noise increase when extraneous light is incident; the signal-to-noise ratio degrades correspondingly and from a respective limit value onward, this can be understood as dazzle.

The control and evaluation unit is preferably configured to set a reflector bit when the level is higher than a reflector threshold and/or to set a noise flag when the signal-to-noise ratio is smaller than a noise threshold. A level above the reflector threshold means that the light beam was incident on a reflector since so much light would not be remitted by another object. This is the function that is typically expected of a reflector recognition. The reason for a set noise flag can, however, also be dazzle from an extraneous light source instead of a reflector. The noise flag indicates that the signal-to-noise ratio is low. The information transmission in the form of flags or bits is particularly advantageous; said threshold criteria can, however, alternatively also be applied and processes elsewhere.

The control and evaluation unit is preferably configured to recognize a phase as a first phase with dazzle when the level of the received signal is higher than a reflector threshold and/or the signal-to-noise ratio is smaller than a noise threshold and at the same time no object is detected. In this case, "and at the same time" should express an exception; the condition that no object is detected should therefore be present in addition to the previously named alternative. This can be expressed in a particularly illustrative manner via the just introduced flags: (reflector and/or noise) AND no object detected. If namely no object is detected, no distance value was measured in the case of a time of light process, the reflector threshold is not exceeded due to a sensed reflector from which a distance would have been measured. The high level or the fact that the signal-to-noise ratio does not permit a measurement, is consequently ascribed to dazzle. In a preferred embodiment, the distance measurement signals the fact that no object was detected by an infinite distance value or a large distance value beyond the range. The recognition of a first phase with dazzle is, as already frequently mentioned, equally complementary possible via the recognition of second phases, with corresponding inverted criteria.

The control and evaluation unit is preferably configured to determine whether an object is located in a protected field configured within the monitored zone and to initiate a safety related response in this case. The sensor accordingly comprises a protected field evaluation that was already described in the introduction. In the case of a protected field infringement, a shutdown signal is preferably output via a safe, in particular two-channel output, of the sensor (OSSD, output signal switching device) by which a monitored machine is switched into a safe sate, for example in that the machine is stopped or slowed down or an evasive movement is carried out. The check of the dazzle can be restricted to the actually configured protected fields.

The control and evaluation unit is preferably configured to determine the first phases and second phases in dependence on an angular position of the deflection unit. The dazzle is then observed in dependence on the angle. It is determined 'per angle or group of adjacent angles whether, how often, how long, or by which time pattern the sensor is dazzled, that is how the distribution of the first and second phases is represented in dependence on the angle. A dazzle flag or a dazzle bit can be set per angle in first phases and cannot be set in second phases, with the dazzle flag being able to be derived, as described above, from a reflector flag and/or a noise flag. The evaluation of the distribution by no means has to remain restricted to individual angles, it can by all means take neighborhoods into account. A single dazzled angle is less critical than a whole sector having a large number of dazzled angles next to one another. For example, a dazzled angle or angular range can be small enough to still safely detect objects using a required detection capability for instance a leg or a body, if only finger-width angular ranges are affected by the dazzle over the range. It is also conceivable to restrict the functional extent, for instance to switch down from finger detection to leg detection. If the application requires finger detection, this is naturally safety critical, but finger detection is possibly not required at all. It is also conceivable to output this restriction of the detection capability so that in this case the finger monitoring is taken over by a different measure or a different sensor. This is in particular helpful when this other sensor brings about restrictions and should therefore not be used permanently for this purpose, such as an ultrasound sensor or a radar that could not fully replace the laser scanner. A further example has already been named, when angles affected by dazzle are outside protected fields, they do not have to be responded to because such dazzle is not safety relevant.

The control and evaluation unit is preferably configured to trigger a safety related response in the dazzle state or on the transition into the dazzle state. In this embodiment, the dazzle state is not tolerated because a safe detection is prevented. The sensor cannot ensure its safety function. It is preferably still checked beforehand whether only the functional extent is reduced and whether this is still safe, for example only a smaller detection capability temporarily being available or a safe range having to be restricted, which is, however, not required at all in the current application or in the active protected field monitoring active at this moment in time or the dazzle only affects angular ranges outside protected fields. The safety related response corresponds to that on an unpermitted protected field intrusion and in particular switches a monitored machine into a safe state.

The control and evaluation unit is preferably configured to output a restriction signal that indicates a restricted detection capability of the sensor, in particular a reduced range. As already addressed, the dazzle state does not have to immediately mean in every situation that safety is no longer ensured. There may be intermediate states in which only the full functional extent is not available. The dazzle can, for example, restrict the range up to which objects are safely detected. Protected fields that require a greater range are then not available as long as the dazzle state lasts. The reduced functional extent can be transmitted to the monitored machine by the restriction signal. Process steps that require a full detection capability, in particular a higher range for correspondingly far away protected fields, are then no longer controllable. The movement speed of a monitored robot is then restricted, for example; a far-reaching processing step is temporarily not possible or the speed of a vehicle having a sensor arranged thereon in mobile applications is restricted.

The method in accordance with the invention can be further developed in a similar manner and shows similar advantages in so doing. Such advantageous features are described in an exemplary, but not exclusive manner in the subordinate claims dependent on the independent claims.

The invention will be explained in more detail in the following also with respect to further features and advantages by way of example with reference to embodiments and to the enclosed drawing. The Figures of the drawing show in:

FIG. 1 a schematic sectional view of a laser scanner;

FIG. 2 an exemplary representation of state flags including a reflector flag and noise flag over a plurality of scans of a laser scanner in an angular range with dazzle from a permanent extraneous light source;

FIG. 3 an exemplary representation of distance measurements over a plurality of scans and an angular range corresponding to FIG. 2;

FIG. 4 an exemplary representation of dazzle flags over a plurality of scans and an angular range corresponding to FIG. 2;

FIG. 5 an exemplary representation of state flags corresponding to FIG. 2 now with dazzle from a periodic extraneous light source;

FIG. 6 an exemplary representation of distance measurements corresponding to FIG. 3 now with dazzle from a periodic extraneous light source as in FIG. 5; and FIG. 7 an exemplary representation of dazzle flags corresponding to FIG. 4 now with dazzle from a periodic extraneous light source as in FIG. 5.

FIG. 1 shows a schematic sectional representation through a laser scanner 10. A light beam 14 which is generated by a light transmitter 12, for example by a laser, is directed into a monitored zone 18 via a deflection mirror 15 and a deflection unit 16 and is there remitted by an object which may be present. The remitted light 20 again arrives back at the laser scanner 10 and is guided there by a reception optics 22 via the deflection unit 16 to a light receiver 24, for example a photodiode or a received signal.

The deflection unit 16 is made as a rule as a rotating mirror unit which rotates continuously by the drive of a motor 26. Alternatively, the measuring head light transmitter 12 and preferably also including a light receiver 24 can rotate. The respective angular position is detected via an encoder 28. The light beam thus 14 sweeps over the monitored zone 18 generated by the rotational movement. If remitted light 20 is received by the light receiver 24 from the monitored zone 18, a conclusion can be drawn on the angular location of the object in the monitored zone 18 from the angular position of the deflection unit 16 by means of the encoder 28.

In addition, while using the received signals of the light receiver 24, a conclusion can be drawn on the distance of the object from the laser scanner 10, for example in a manner known per se from the time of flight of individual light pulses from their transmission up to their reception after reflection at the object in the monitored zone 18, in a pulse averaging process, a phase process, or an FMCW process.

The determination of the distance of the object from the laser scanner 10 takes place in a control and evaluation unit 32 that is also connected, in addition to the light receiver 24, to the light transmitter 12, the motor 26, and the encoder 28. Two-dimensional polar coordinates of all the objects in the monitored zone 18 are thus available via the angle and the distance. In a further embodiment, a plurality of light beams 14 are transmitted at different elevations to form a multilayer scanner and to detect a plurality of layers in a three-dimensional monitored zone 18. All the measured values can be output via a output 34. All the named functional components are arranged in a housing 36 which has a front screen 38 in the region of the light exit and of the light entry.

In a technical safety application, the control and evaluation unit 32 compares the position of the detected objects using one or more protected fields whose geometry is specified to or configured for the control and evaluation unit 32 by corresponding parameters. The control and evaluation unit 32 thus recognizes whether a protected field has been infringed, that is whether an unpermitted object is located therein and switches the output 34 configured as a safety output (OSSD, output signal switching device) in this embodiment in dependence on the result. A safety related response is thereby triggered, for example an emergency stop, a braking, a deceleration, or an evasion of a connected machine monitored by the laser scanner 10. The monitored machine is, for example, an industrial machine, a robot, or, in mobile applications, a vehicle, in particular a driverless vehicle. Such a laser scanner is configured as a safety laser scanner by satisfying the standards named in the introduction and by the measured required therefor.

The laser scanner 10 can be dazzled by an external light source 40. The external light source 40 here does not necessarily have to be located in the monitored zone 18. It is sufficient for extraneous light 42 transmitted by the external light source 40 to reach the light receiver 24 of the laser scanner 10 and to there produce dazzle of the light receiver 24. The control and evaluation unit 32 recognizes such a dazzle and is able to distinguish between permanent dazzle impairing the safe function, for example by a construction site floodlight, and a periodic dazzle, for example of a further laser scanner or a 3D TOF camera that still enables a safe object detection at least with a restricted functional extent sufficient for the current safety application. This dazzle recognition will be explained in more detail in the following with reference to FIGS. 2 to 7. If intolerable dazzle is recognized, this preferably results in technical safety applications in a safety related response; otherwise, a dazzle warning can be output or the functional extent can be reduced.

FIGS. 2 to 4 show examples of evaluations of a plurality of scans over an angular range, initially with permanent dazzle, and the evaluations corresponding to FIGS. 5 to 7 on dazzle from periodic extraneous light. In this respect in each case, a purely exemplary angle section with seven measurements in consecutive angular positions is entered on the X axis and the running number of the scans is entered on the Y axis, which corresponds to a time axis since every scan lasts a revolution period of the deflection unit 16. A pattern of cells thereby arises in which a respective measurement or evaluation result for the associated angle and scan is entered. In the case of a pulse averaging process, the individual measurements for a histogram detection and a distance determination are already combined in the cells.

FIG. 2 shows state flags that are acquired in the measurement. There are four such flags or bits in this example, therefore values from 0 . . . 15, with here, however, only one reflector flag being of interest as a bit 0 and a noise flag as a bit 1. This particular representation for a reflector and noise recognition is to be understood purely by way of example and can be modified. In FIG. 2, measurements in which only the reflector flag has been set are shown as light cells and measurements in which the reflector flag and the noise flag have been set as dark cells. It is necessary to remember here that a situation with permanent dazzle is shown; in this case, the detection of a 70 mm sample that is arranged directly in front of a horizontally aligned 1500 W halogen radiator. In other measurement situations, it is the standard case that neither the reflector flag nor the noise flag is set.

For a reflector recognition should actually be implemented by the reflector flag, i.e. it should be recognized whether an object from which a distance has been measured is a reflector to output it as additional measurement information or to correct the distance measurement. The noise flag in turn indicates great noise or a poor signal-to-noise ratio. Both are first only indicators of dazzle. A reflector and great noise or a poor signal-to-noise ratio can be recognized by level evaluations and other evaluations of the received signal. The reflector bit is set, for example, when the current in the light receiver 24 exceeds a threshold. Noise can in particular be measured while the light transmitter 12 is inactive or at times that do not correspond to a received light pulse. A CW light portion of the extraneous light can also be isolated by low pass filtering.

FIG. 3 shows measured distance values. The entries at a cell of the same position in FIGS. 2 to 4 correspond to one another. The distance from an object is entered in meters or in another unit of length in the light cells of FIG. 3. The value "65" stands for "infinite" in the dark cells, i.e. no object was detected here or no distance could be measured. A distance was accordingly measured in the light cells despite the reflector and noise flags. It is not clear to the laser scanner 10 in the dark cells whether an object has possibly been overlooked here. This is actually the case in the exemplary situation since the sample also extends over the dark cells.

FIG. 4 shows dazzle flags that are acquired by a combination of the evaluations in accordance with FIGS. 2 and 3. In FIG. 4, dazzle flags are highlighted both numerically by a one and by dark coloring. Dazzle is present when simultaneously a high level is present and no distance can be measured. The first is indicated in FIG. 2 by a set reflector and/or noise flag, the latter in FIG. 3 by a value "65" or infinite. The evaluation can thus be combined in the formula Dazzle flag=(reflector flag and/or noise flag) AND no object or distance infinite).

As is shown, all the individual measurements or cells are admittedly not dazzled in this example, but indeed all the scans or lines. The detection capability is thus restricted. A subsequent evaluation now assesses whether this form of dazzle can be tolerated or not. In a spatial aspect, dazzle only possibly permits safe detection at least with coarser detection capability such as arm, leg, or body protection via isolated or less adjacent angle steps or safe detection is at least still possible up to a reduced range. Dazzle outside protected fields is furthermore not safety relevant and may be ignored.

A time observation of the distribution of dazzled measurements or scans is of particular interest. The detection capability may be degraded over a certain time period, preferably for five seconds in accordance with the standard EN61496-3. This time period is accordingly available to assess whether dazzle is safety related and whether the laser scanner 10 has to emit a safety relevant shutdown signal. In accordance with the unpublished European patent application having the file reference 21187348.4 named in the introduction, the dazzle warning is reset if a certain number of scans do not show any dazzle. It the dazzle warning is nevertheless applied for a full five seconds, the safety related shutdown signal is output.

In the situation in accordance with FIGS. 2 to 4 with permanent dazzle, the situation never arises that the dazzle warning is reset. This is a natural feature and can also not be remedied by more intelligent evaluation. A substantial improvement possibility is, however, present in the case that the extraneous light source periodically dazzles, like a further laser scanner or a 3D TOF camera.

FIGS. 5 to 7 illustrate this analogously to FIGS. 2 to 4, now for a periodic disruption, in this example every 30 ms with a scan period of the laser scanner of of 40 ms.

FIG. 5 shows analogously to FIG. 2 the reflector and noise flag, now with periodic dazzle. It can be clearly recognized that the cells highlighted in gray with a set reflector flag appear in periodically recurring scans in neither a reflector flag nor a noise flag is set in the scans therebetween.

Figure 1:
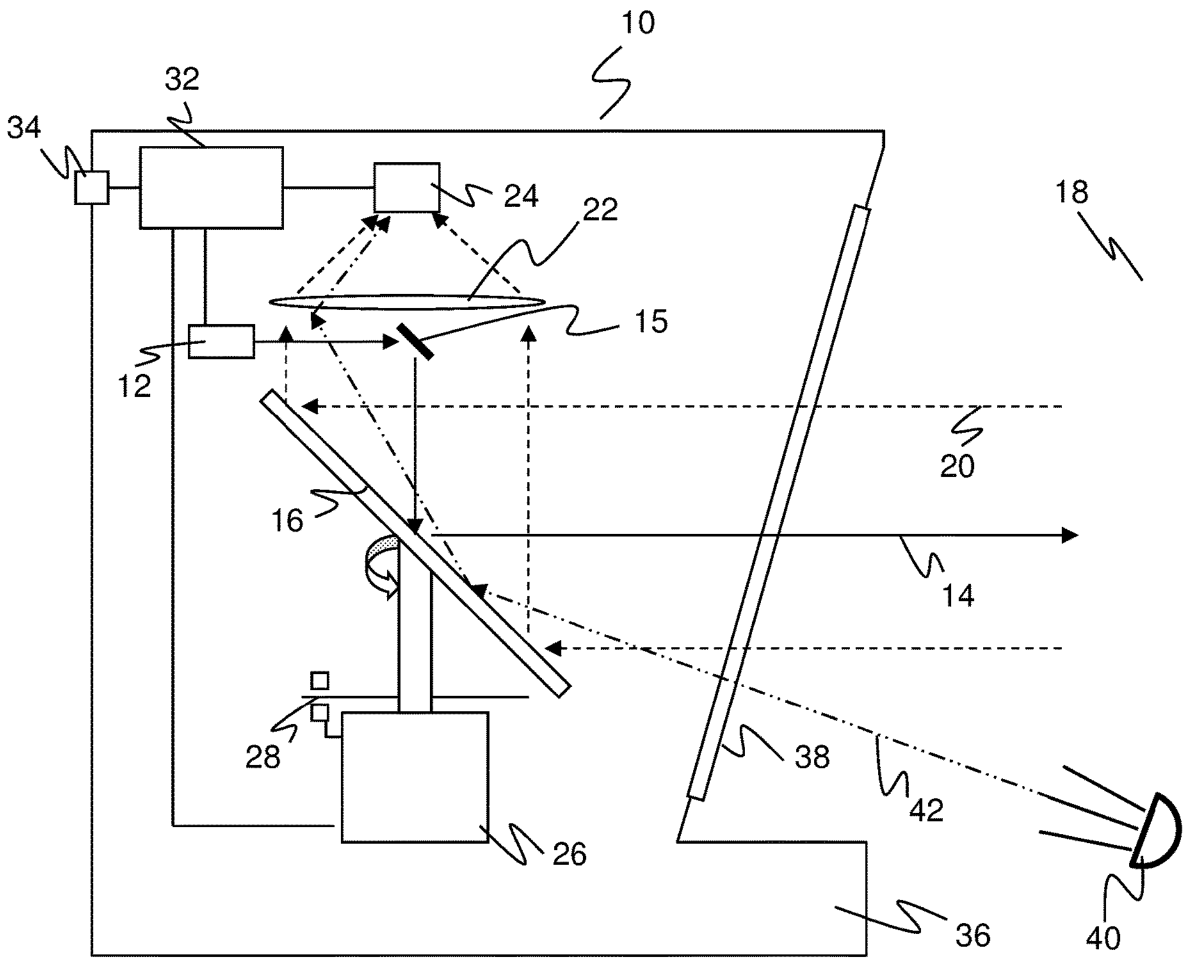

FIG. 6 analogously to FIG. 3 shows the distances measured with periodic dazzle. No object was able to be detected or no distance was able to be measured in the dark highlighted cells so that here a "65" is entered as a value for infinite.

In FIG. 7 analogously to FIG. 4, the reflector and noise flags of FIG. 5 are combined with the distance measurements of FIG. 6 to form dazzle flags. Approximately thirty percent of the scans are dazzled, in recurring groups of one to two scans. The time pattern of the dazzled scans results as a kind of beat from the scan frequency and the repetition frequency of the periodic extraneous light irradiation.

In accordance with the dazzle recognition of the unpublished European patent application with the file reference 21187348.4 named in the introduction, the dazzle warning is reset if dazzle is no longer recognized for a sufficient period. The respective four dazzle-free scans of FIG. 7 do not suffice for this. It is also not possible simply to further curtail the time period up to the reset of the dazzle warning because dazzle would thus be overlooked and in addition the explained beat does not ensure at all that there is ever a time period up to the reset that would be short enough. The dazzle warning therefore remains permanently active despite the only periodic dazzle until the safety related shutdown due to dazzle is triggered after five seconds.

In accordance with the invention, the time pattern of the dazzled cells or scans is therefore analyzed by the control and evaluation unit 32 as is illustrated by way of example in FIG. 7. In an embodiment, the number of dazzled scans or cells is counted within the specified time period of a permitted reduced detection capability of, for example, five seconds. This can in particular be carried out continuously or in a rolling manner. If the scan period is, for example, 50 ms, a hundred scans can be evaluated over five seconds. If the number of dazzled scans exceeds a previously defined critical portion or limit value, this is considered as a critical dazzle state and a safety related shutdown signal is output.

The laser scanner 10 thus recognizes that no permanent dazzle is present, but rather recognizes the portion of thirty percent of the dazzled scans and can decide whether that can still be tolerated. Corresponding information can also be output that a periodic dazzle has been recognized; this facilitates the diagnosis and makes it possible to reduce or to eliminate the dazzle influence.

Dazzle due to a further laser scanner or a 3D TOF camera is as a rule not critical in the technical safety observation since dark objects of the minimum extent still to be detected in accordance with the required detection capability are not outshined due to the typical illumination optics of such disruptor sensors. It is therefore very unlikely that a periodic extraneous light disruption would result in a safety relevant detection failure. In contrast, large halogen floodlights can indeed outshine said dark objects particularly with a horizontal alignment. If a geometrical observation shows that smaller objects are also outshone by a further laser scanner or by the illumination of a 3D TOF camera, the dazzle recognition in accordance with the invention can be deactivated for correspondingly fine detection capability or the possibility of use is restricted to specific protected field configurations and ranges.

The observation of the time pattern of the dazzled cells or scans in accordance with the example of FIG. 7 can turn out to be more complex than a simple counting. Practically any desired pattern recognition processes are conceivable that categorize specific time patterns as critical and others as uncritical or distinguish between permanent dazzle and periodic dazzle. The total comprehensive arsenal known per se of filters and pattern recognition processes, including neural networks, is available here. The dazzled and non-dazzled scans can, for example, be understood as a time row and periodicities can then be located by Fourier analyses, autocorrelations, or simplified processes based thereon.

With knowledge of a time pattern of the dazzle, the affected scans or measurements can be removed by calculation or measurement are always directly made when no dazzle is present. In particular the pulse of a 3D TOF camera can be evaded on very short time scales by a corresponding time offset. The time pattern can be taught for such measures while no separate measurements are temporarily carried out and a monitored machine is not released via the output 34.

In the previous embodiments, the dazzled scans or measurements are localized by evaluation of the received signal of the light receiver 24. Additionally or alternatively a further light receiver can be used for this purpose by which dazzle is recognized. It can be a dedicated light receiver, but existing light receivers of a front screen monitoring can also be made use of, for example.

An advantageous addition is a reminder function or object tracking. Where an object has been detected is therefore immediately known after dazzling. The number of required multiple evaluations can in particular also be reduced, also down to one if an object had already been detected earlier at the corresponding location or is expected in accordance with object tracking, with a multiple evaluation, i.e. the demand that a protected field intrusion has to be confirmed over a plurality of consecutive scans before a safeguarding takes place.

The invention claimed is:

1. An optoelectronic sensor for detecting objects in a monitored zone, comprising:

a light transmitter for transmitting at least one light beam;

a movable deflection unit for periodic scanning of the monitored zone by the at least one light beam;

a light receiver for generating a received signal from the light beam remitted by the objects; and a control and evaluation unit that is configured to:

acquire information on the objects in the monitored zone from the received signal, wherein the acquiring of the information comprises measuring a distance of the objects using a time of flight process and recognizing dazzling at the light receiver;

recognize first phases with the dazzling and second phases without dazzle, wherein the first phases are first measurement periods and the second phases are second measurement periods;

decide, with reference to a distribution of the first phases and the second phases, whether detection of the objects in the monitored zone for safety purposes is prevented by the dazzle;

switch to a dazzle state when the detection of the objects in the monitored zone for the safety purposes is decided to be prevented by the dazzle; and count the first phases over a time interval and/or determine an accumulated duration of the first phases over the time interval.

2. The optoelectronic sensor in accordance with claim 1, wherein the optoelectronic scanner is a laser scanner.

3. The optoelectronic sensor in accordance with claim 1, wherein the control and evaluation unit is configured to determine a time pattern of the first phases and of the second phases and to decide whether the dazzle impairs the detection using said time pattern.

4. The optoelectronic sensor in accordance with claim 3, wherein the control and evaluation unit is configured to place the detection of the objects at times in which two of the first and second phases lie in accordance with a recognized time pattern.

5. The optoelectronic sensor in accordance with claim 1, further comprising an additional light receiver for dazzle recognition.

6. The optoelectronic sensor in accordance with claim 1, wherein the control and evaluation unit is configured to recognize the dazzling using the received signal.

7. The optoelectronic sensor in accordance with claim 1, wherein the control and evaluation unit is configured to recognize the dazzle with reference to a level determination of the received signal or a determination of the signal-to-noise ratio of the received signal.

8. The optoelectronic sensor in accordance with claim 7, wherein the control and evaluation unit is configured to set a reflector bit when the level is higher than a reflector threshold and/or to set a noise flag when the signal-to-noise ratio is smaller than a noise threshold.

9. The optoelectronic sensor in accordance with claim 7, wherein the control and evaluation unit is configured to recognize a phase as a first phase with dazzle when the level of the received signal is higher than a reflector threshold and/or the signal-to-noise ratio is smaller than a noise threshold and at the same time no object is detected.

10. The optoelectronic sensor in accordance with any claim 1, wherein the control and evaluation unit is configured to determine whether an object is located in a protected field configured within the monitored zone and to initiate a safety related response in this case.

11. The optoelectronic sensor in accordance with claim 1, wherein the control and evaluation unit is configured to determine the first phases and second phases in dependence on an angular position of the deflection unit.

12. The optoelectronic sensor in accordance with claim 1, wherein the control and evaluation unit is configured to trigger a safety related response in the dazzle state or on the transition into the dazzle state.

13. The optoelectronic sensor in accordance with claim 1, wherein the control and evaluation unit is configured to output a restriction signal that indicates a restricted detection capability of the optoelectronic sensor.

14. The optoelectronic sensor in accordance with claim 13, wherein the restriction signal comprises a reduced range.

15. A method of detecting objects in a monitored zone, comprising:

transmitting at least one light beam;

periodically scanning the monitored zone with the at least one light beam;

generating a received signal using a light receiver from the light beam remitted by the objects; and evaluating the received signal to acquire information on the objects in the monitored zone by measuring a distance of the objects using a time of flight process and recognizing dazzling at the light receiver;

recognizing a dazzling of the light receiver, a transition into a dazzle state occurring when the dazzle prevents detection of the objects in the monitored zone for safety purposes, wherein first phases with the dazzling and second phases without dazzle are recognized and a decision is made with reference to a distribution of the first phases and the second phases whether the dazzle prevents the detection of the objects in the monitored zone for the safety purposes, wherein the first phases are first measurement periods and the second phases are second measurement periods, the method further comprising switching to a dazzle state when the detection of the objects in the monitored zone for the safety purposes is decided to be prevented by the dazzle; and the method further comprising counting the first phases over a time interval and/or determining an accumulated duration of the first phases over the time interval.

* * * * *